US010430660B2

(12) United States Patent
Miyasako (10) Patent No.: US 10,430,660 B2
(45) Date of Patent: Oct. 1, 2019

(54) IMAGE PROCESSING APPARATUS, CONTROL METHOD THEREOF, AND STORAGE MEDIUM

(71) Applicant: CANON KABUSHIKI KAISHA, Tokyo (JP)

(72) Inventor: Kenichi Miyasako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 14/745,773

(22) Filed: Jun. 22, 2015

(65) Prior Publication Data

US 2015/0371090 A1      Dec. 24, 2015

(30) Foreign Application Priority Data

Jun. 24, 2014   (JP) ................................. 2014-129707

(51) Int. Cl.
*H04N 5/85* (2006.01)
*G06K 9/00* (2006.01)
(Continued)

(52) U.S. Cl.
CPC .......... *G06K 9/00744* (2013.01); *G06T 5/003* (2013.01); *H04N 5/772* (2013.01); *H04N 9/8205* (2013.01); *G06T 2207/20201* (2013.01)

(58) Field of Classification Search
CPC .. H04N 5/145; H04N 19/513; H04N 5/23287; G06T 7/20; G06T 5/002
See application file for complete search history.

(56) References Cited

U.S. PATENT DOCUMENTS 6,377,623 B1    4/2002  Ra et al.
2001/0051038 A1*  12/2001  Ko ........................ C08L 67/025
                                                                386/239

(Continued)

FOREIGN PATENT DOCUMENTS

CN          101123728 A    2/2008
CN          101938652 A    1/2011
(Continued)

OTHER PUBLICATIONS

British Search Report issued on Dec. 14, 2015, that issued in the corresponding U.K. Patent Application No. GB1510251.0.
(Continued)

*Primary Examiner* — Hung Dang
*Assistant Examiner* — Sunghyoun Park
(74) *Attorney, Agent, or Firm* — Cowan, Liebowitz & Latman, P.C.

(57) ABSTRACT

An image processing apparatus comprises a motion vector detection unit, a generation unit for generating information regarding the motion vector as metadata, a recording unit for recording each frame image in association with the metadata; and a control unit for causing the motion vector detection unit to perform motion vector detection by using an image signal on which reduction processing or thinning processing was performed, and causing the motion vector detection unit to determine an image area based on the metadata and to perform motion vector detection by using an image signal on which reduction processing or thinning processing was not performed or on which reduction processing was performed using a smaller reduction ratio than that used during the image capturing operation or thinning processing was performed using a smaller thinning ratio than that used during the image capturing operation.

20 Claims, 8 Drawing Sheets

(51) Int. Cl.
   *H04N 5/77*   (2006.01)
   *H04N 9/82*   (2006.01)
   *G06T 5/00*   (2006.01)

(56) References Cited

U.S. PATENT DOCUMENTS

| | | |
|---|---|---|
| 2004/0161157 A1 | 8/2004 | Sato et al. |
| 2006/0152590 A1* | 7/2006 | Kage .................. G06T 7/20 348/208.1 |
| 2007/0064977 A1* | 3/2007 | Nagata ................ H04N 5/145 382/107 |
| 2007/0188619 A1* | 8/2007 | Kurata ................ H04N 5/145 348/208.99 |
| 2009/0103888 A1* | 4/2009 | Murabayashi ..... G06K 9/00711 386/248 |
| 2009/0110372 A1* | 4/2009 | Morioka ............. G11B 27/034 386/248 |
| 2009/0123082 A1* | 5/2009 | Atanssov ................ G06T 5/50 382/236 |
| 2009/0207915 A1 | 8/2009 | Yan et al. |
| 2010/0225790 A1* | 9/2010 | Sasaki ...................... G06T 5/50 348/241 |
| 2011/0075736 A1 | 3/2011 | Endo |
| 2011/0142414 A1* | 6/2011 | Lee ................... H04N 5/23251 386/242 |
| 2012/0300844 A1 | 11/2012 | Ma et al. |
| 2013/0294514 A1* | 11/2013 | Rossato ............... H04N 19/139 375/240.16 |

FOREIGN PATENT DOCUMENTS

| | | |
|---|---|---|
| CN | 102934439 A | 2/2013 |
| CN | 103327319 A | 9/2013 |
| EP | 0710032 A2 | 5/1996 |
| JP | 2009-152802 A | 7/2009 |
| WO | 02/09419 A2 | 1/2002 |

OTHER PUBLICATIONS

The above patent document was cited in a British Search Report issued on Nov. 28, 2017, a copy of which is enclosed, that issued in the corresponding U.K. Patent Application No. 1715875.9.

The above references were cited in a Nov. 2, 2017 Chinese Patent Office Action, a copy of which is enclosed,1 with translation, that issued in Chinese Patent Application No. 201510349846.0. X.

* cited by examiner

IMAGE PROCESSING APPARATUS, CONTROL METHOD THEREOF, AND STORAGE MEDIUM

BACKGROUND OF THE INVENTION

Field of the Invention

The present invention relates to a technique for mechanically or electronically correcting an image blur in an image capturing apparatus.

Description of the Related Art

In recent years, the number of pixels of an image capturing apparatus capable of capturing moving images is rapidly increasing. Image capturing apparatuses that capture full HD sized moving images are already in wide use, and image capturing apparatuses capable of capturing 4K moving images are also gradually coming into the market. Furthermore, technical development is also underway for 8K super high vision broadcasting which is expected to be available in the future.

With such a trend toward higher definition moving images, with respect to the technique for correcting an image blur in an image capturing apparatus, demand is growing for a highly accurate technique for correcting a finer image blur. Various proposals have been conventionally made on image stabilization function of correcting a blur in a captured image. For example, Japanese Patent Laid-Open No. 2009-152802 discloses a technique in which motion vector information of video detected by an image capturing apparatus is recorded together with a video signal, and image stabilization processing is performed when the video is played back.

However, the following problem arises in a motion vector detection circuit used to detect an image blur in the above-descried conventional technique if the image size of the video signal increases.

A motion vector is detected by, in the case where an image has a characteristic shape such as an edge, computing a positional change on an image of the characteristic shape between the current frame image and the past frame image. Accordingly, a detection area in the image where a motion vector is detected is required to have a size enough to include the characteristic shape of the image. A small detection area brings about a deterioration in the accuracy of motion vector detection. A moving image having a large image size has, as compared to a moving image having a small image size, a greater number of pixels in an image area including an object of the same size. For example, when a full HD (1920×1080 pixels) sized moving image is compared with a 4K (3840×2160 pixels) moving image, the number of pixels increases four times, and when it is compared with a 8K (7680×4320 pixels) moving image, the number of pixels increases sixteen times, which inevitably leads to an increase in the circuit scale and an increase in the power consumption caused by the increase in the circuit scale.

SUMMARY OF THE INVENTION

The present invention has been made in view of the problem described above, and improves motion vector detection accuracy while suppressing an increase in the circuit scale.

According to the first aspect of the present invention, there is provided an image processing apparatus comprising: a motion vector detection unit configured to perform motion vector detection by using an image signal output from an image sensor; a generation unit configured to generate information regarding a result of the motion vector detection as metadata; a recording unit configured to record each frame image of a moving image output from the image sensor in a recording medium in association with the metadata; and a control unit configured to cause, during an image capturing operation, the motion vector detection unit to perform motion vector detection by using an image signal output from the image sensor on which reduction processing or thinning processing was performed, and cause, during a playback operation of playing back the recorded image, the motion vector detection unit to determine an image area in the each frame image in which motion vector detection is to be performed based on the metadata and to perform motion vector detection by using an image signal output from the recording medium on which reduction processing or thinning processing was not performed or on which reduction processing was performed using a smaller reduction ratio than that used during the image capturing operation or thinning processing was performed using a smaller thinning ratio than that used during the image capturing operation.

According to the second aspect of the present invention, there is provided an image processing apparatus comprising: an analysis unit configured to analyze metadata that is information regarding a result of motion vector detection recorded in association with each frame image of a moving image output from an image sensor; a control unit configured to cause, during a playback operation of playing back the recorded image, an image area in the each frame image in which motion vector detection is to be performed to be determined based on the metadata, and motion vector detection to be performed by using an image signal output from a recording medium on which reduction processing or thinning processing was not performed or on which reduction processing was performed using a smaller reduction ratio than that used during an image capturing operation or thinning processing was performed using a smaller thinning ratio than that used during an image capturing operation, wherein the metadata is data obtained by motion vector detection performed using an image signal output from the image sensor on which reduction processing or thinning processing was performed during the image capturing operation.

According to the third aspect of the present invention, there is provided a control method for controlling an image processing apparatus, the method comprising: a motion vector detection step of performing motion vector detection by using an image signal output from an image sensor; a generation step of generating information regarding a result of the motion vector detection as metadata; a recording step of recording each frame image of a moving image output from the image sensor in a recording medium in association with the metadata; and a control step of causing, during an image capturing operation, the motion vector detection step to perform motion vector detection by using an image signal output from the image sensor on which reduction processing or thinning processing was performed, and causing, during a playback operation of playing back the recorded image, the motion vector detection step to determine an image area in the each frame image in which motion vector detection is to be performed based on the metadata and to perform motion vector detection by using an image signal output from the recording medium on which reduction processing or thinning processing was not performed or on which reduction processing was performed using a smaller reduction ratio than that used during the image capturing operation or thinning processing was performed using a smaller thinning ratio than that used during the image capturing operation.

According to the fourth aspect of the present invention, there is provided a control method for controlling an image processing apparatus, the method comprising: an analysis step of analyzing metadata that is information regarding a result of motion vector detection recorded in association with each frame image of a moving image output from an image sensor; and a control step of causing, during a playback operation of playing back the recorded image, an image area in the each frame image in which motion vector detection is to be performed to be determined based on the metadata, and motion vector detection to be performed by using an image signal output from a recording medium on which reduction processing or thinning processing was not performed or on which reduction processing was performed using a smaller reduction ratio than that used during an image capturing operation or thinning processing was performed using a smaller thinning ratio than that used during an image capturing operation, wherein the metadata is data obtained by motion vector detection performed using an image signal output from the image sensor on which reduction processing or thinning processing was performed during the image capturing operation.

Further features of the present invention will become apparent from the following description of exemplary embodiments with reference to the attached drawings.

DESCRIPTION OF THE EMBODIMENTS

Hereinafter, embodiments of the present invention will be described in detail with reference to the accompanying drawings.

First Embodiment

Figure 1A:
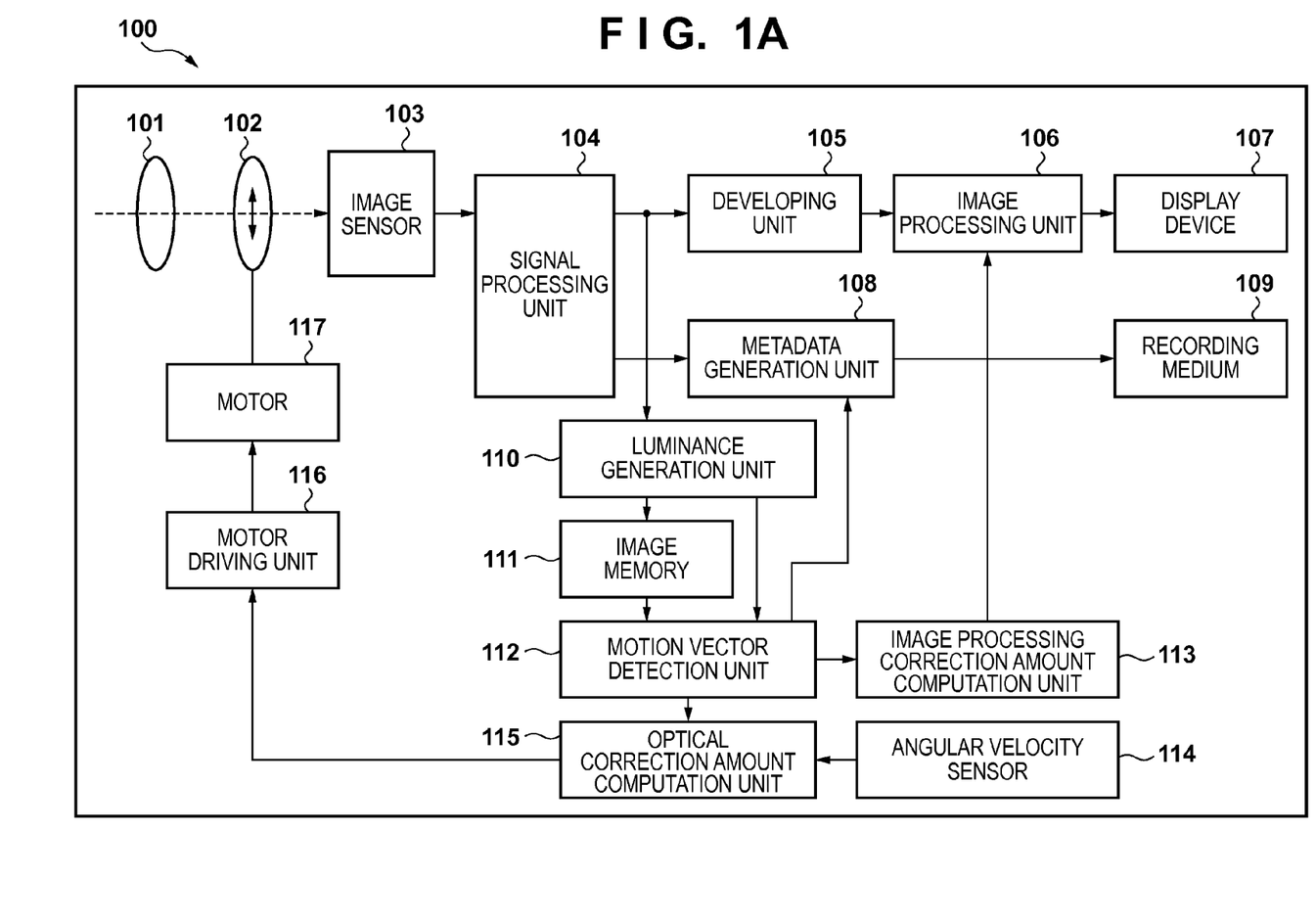
FIGS. 1A and 1B are block diagrams showing a configuration of a video camera that is a first embodiment of an image capturing apparatus according to the present invention.
Figure 1B:
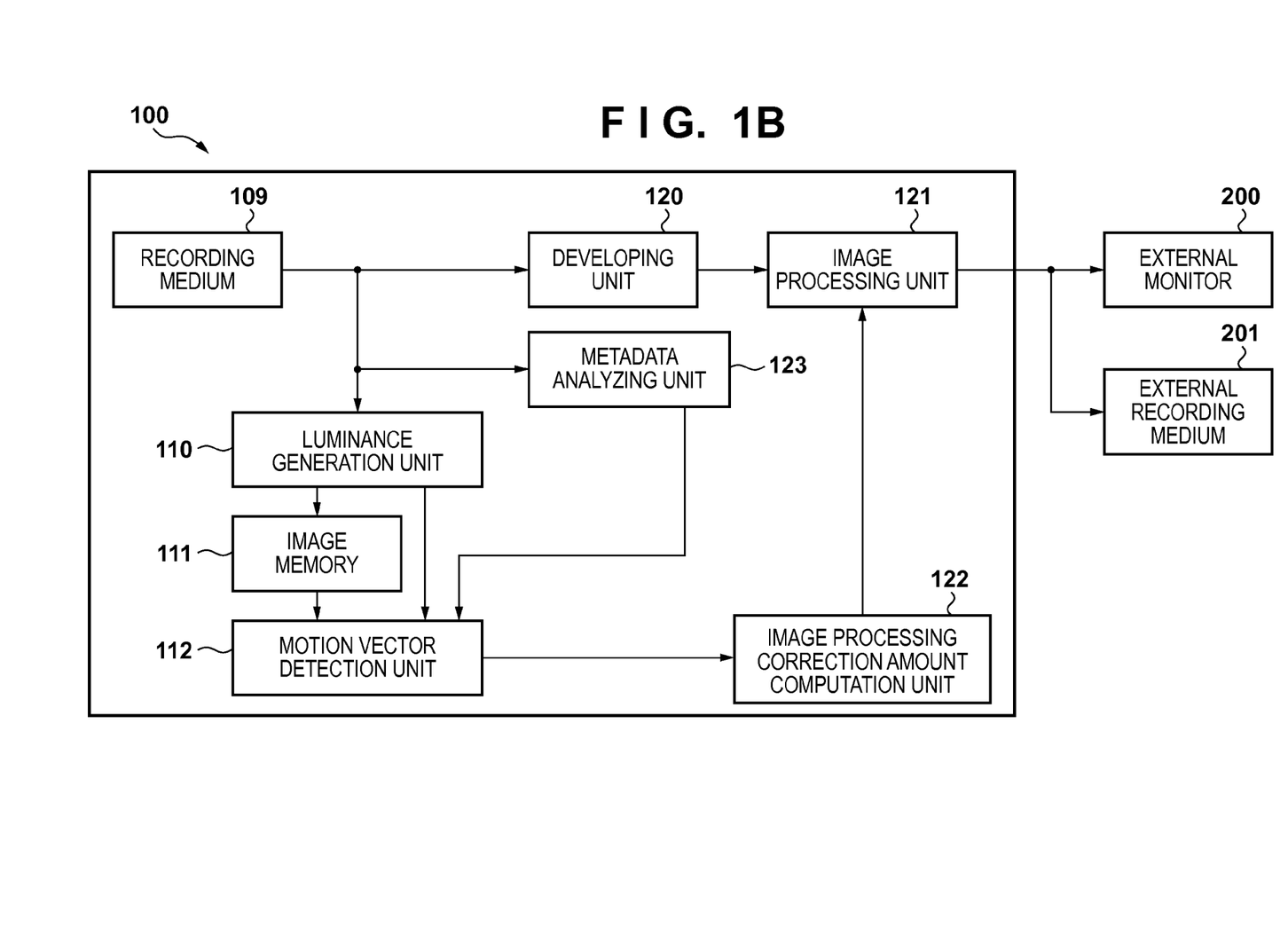

FIGS. 1A and 1B are block diagrams showing a configuration of a video camera that is a first embodiment of an image capturing apparatus according to the present invention. FIG. 1A shows blocks of an image capturing apparatus used at the time of capturing a moving image, and FIG. 1B shows blocks of the image capturing apparatus used at the time of playback of the moving image. The blocks shown in FIGS. 1A and 1B are controlled by a control unit (not shown) provided in the image capturing apparatus.

First, constituent elements of an image capturing apparatus 100 that are used at the time of capturing a moving image and operations performed by the constituent elements will be described specifically with reference to FIG. 1A. An object image input into the image capturing apparatus is formed on an image sensor 103 via an image capturing optical system 101 that performs operations such as zooming and focusing and a correction optical system 102. The correction optical system 102 is, for example, a shift lens, and is a correction system that is capable of optically correcting a blur and that deflects the orientation of the optical axis by being moved in a direction perpendicular to the optical axis. The correction optical system 102 corrects the movement of an object image on an imaging plane caused by the apparatus being jittered, and the object image is formed on the image sensor 103.

The image sensor 103 converts the object image formed by the image capturing optical system 101 into an electric signal as a captured image signal, and supplies the signal to a signal processing unit 104. The signal processing unit 104 distributes the image input from the image sensor 103 to two systems.

The signal processing unit 104 outputs a RAW image of Bayer arrangement output from the image sensor 103 to a metadata generation unit 108 without performing any processing on the image. The metadata generation unit 108 generates predetermined metadata based on information from a motion vector detection unit 112, and records the metadata in a recording medium 109 together with the RAW image. The operations performed by the metadata generation unit 108 will be described later in detail.

Also, the signal processing unit 104 performs thinning processing, addition processing (reduction processing) or the like on the RAW image of Bayer arrangement output from the image sensor 103 so as to reduce the image size to a size smaller than that of the image output from the image sensor 103, and thereafter supplies the reduced image to a developing unit 105 and a luminance generation unit 110.

The luminance generation unit 110 generates a luminance signal from the image signal supplied by the signal processing unit 104, and supplies the luminance signal to an image memory 111 and the motion vector detection unit 112. The motion vector detection unit 112 detects a motion vector of the image based on the luminance signal of the current frame image generated by the luminance generation unit 110 and the luminance signal of an image that is one frame prior to the current frame image temporarily stored in the image memory 111. The motion vector output detected by the motion vector detection unit 112 is supplied to an image processing correction amount computation unit 113 and an optical correction amount computation unit 115.

The optical correction amount computation unit 115 receives supply of the output from the motion vector detection unit 112 and an output from an angular velocity sensor 114. The angular velocity sensor 114 detects vibration applied to the image capturing apparatus 100 as an angular velocity signal, and supplies the angular velocity signal to the optical correction amount computation unit 115. The optical correction amount computation unit 115 calculates the amount of drive of the correction optical system 102 required to correct an image blur generated on the imaging plane of the image sensor 103 based on the outputs from the angular velocity sensor 114 and the motion vector detection unit 112, and sends an instruction to a motor driving unit 116. A motor 117 is a voice coil motor for driving the correction optical system 102, and as a result of the motor 117 being driven by the motor driving unit 116, the correction optical system 102 is moved in a direction perpendicular to the optical axis. In this way, an image blur correction is performed.

In order to display the currently captured image on a display device 107, the developing unit 105 converts the image data of Bayer arrangement supplied from the signal processing unit 104 into a data format suitable for the display device such as the YUV format, and supplies the image to an image processing unit 106. The image processing unit 106 performs predetermined image processing such as electronic image stabilization processing on the image output from the developing unit 105 in response to an instruction from the image processing correction amount computation unit 113, and outputs the image to the display device 107. The image processing correction amount computation unit 113 determines an output to be supplied to the image processing unit 106 based on the output from the motion vector detection unit 112. The processing performed by the image processing unit 106 and the image processing correction amount computation unit 113 will be described later.

Next, constituent elements of the image capturing apparatus 100 constituting a recorded moving image playback part and operations performed by the constituent elements will be described specifically with reference to FIG. 1B. In FIG. 1B, blocks that are the same as those of FIG. 1A are given the same reference numerals, and a detailed description thereof is omitted here.

If an instruction to play back a recorded moving image is issued from the user to the image capturing apparatus 100 via an operation member (not shown), data recorded at the time of capturing the moving image is read from the recording medium 109. Among the read data, RAW image data is supplied to a developing unit 120 and the luminance generation unit 110, metadata generated by the metadata generation unit 108 is supplied to a metadata analyzing unit 123.

The motion vector detection unit 112 performs more highly accurate motion vector detection than that performed at the time of capturing the moving image based on the information at the time of capturing the moving image supplied by the metadata analyzing unit 123. An image processing correction amount computation unit 122 determines an output to be supplied to an image processing unit 121 based on the output from the motion vector detection unit 112. The operations performed at the time of playback of the moving image will be described later in detail.

In order to output the currently played back image to an external monitor 200 and an external recording medium 201, the developing unit 120 converts the image data of Bayer arrangement supplied from the recording medium 109 into a data format suitable for the display device such as the YUV format and supplies the image data to the image processing unit 121. The image processing unit 121 performs predetermined image processing on the image output from the developing unit 120 in response to an instruction from the image processing correction amount computation unit 122, and outputs video data to be output to the external monitor 200 and the external recording medium 201. The external monitor 200 and the external recording medium 201 are connected by a cable via, for example, an external terminal of the image capturing apparatus 100, and a video signal in a format conforming the SDI (Serial Digital Interface) format or the like is output from the image processing unit 121.

Next is a detailed description of blocks that are characteristic to the present embodiment. The motion vector detection unit 112 compares luminance data of the current image generated by the luminance generation unit 110 and luminance data of the past image temporarily stored in the image memory 111 so as to calculate the amount of image movement. As the calculation method, any method can be used such as a feature point extraction method in which search is performed for a feature point such as an edge in images and the images around the feature point are compared, or a block matching method in which an image is divided into a plurality of blocks, and the amount of image movement is computed for each block (each detection area). The present embodiment will be described using the block matching method.

Figure 2A:
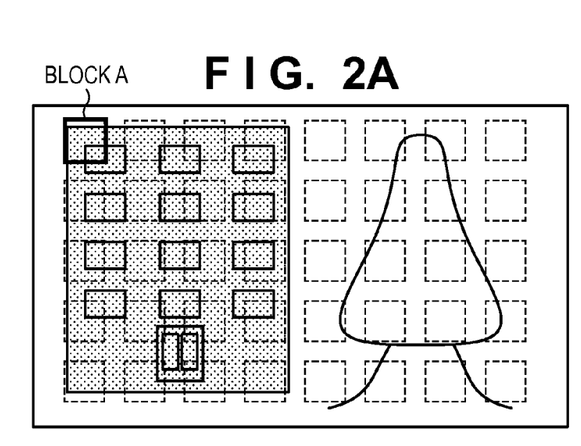
FIGS. 2A to 2E are diagrams illustrating operations performed by a motion vector detection unit 112.
Figure 2B:
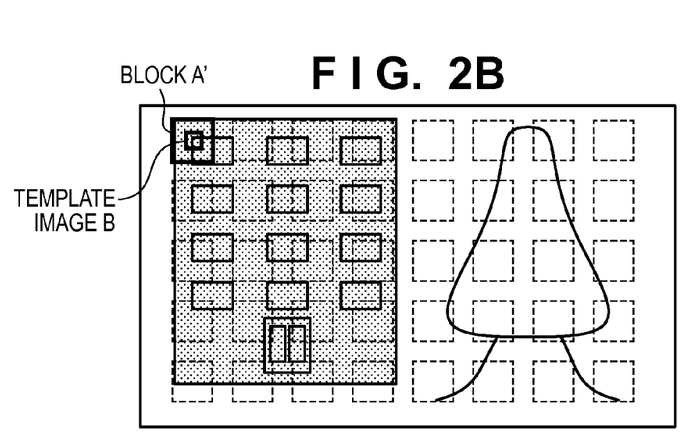

FIG. 2A is a diagram showing an example of an image divided into a plurality of blocks. FIG. 2A shows an example of an image divided into 8 (widthwise)×5 (lengthwise) blocks for use in motion vector detection, which are indicated by dotted lines. FIG. 2B shows a subsequent (future) image generated after FIG. 2A in which the position of an object in FIG. 2B has been shifted upward with respect to the position of the object in FIG. 2A due to the influence of vibration applied to the image capturing apparatus.

Figure 2C:
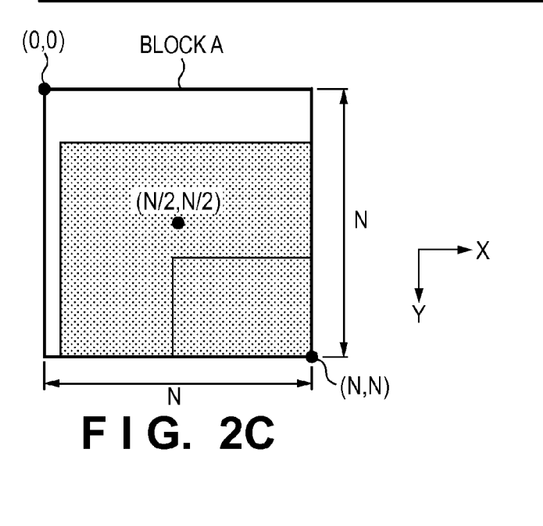
Figure 2D:
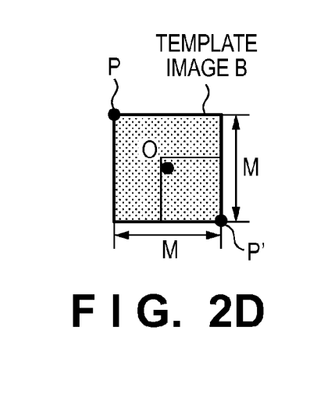

FIGS. 2C and 2D are diagrams illustrating a method for calculating the amount of image movement in a block A shown in FIG. 2A. In order to calculate the amount of image movement in the block A, first, an image that is within a block A' of the image shown in FIG. 2B corresponding to the block A, is smaller than the block A' and has the center position matching that of the block A' is set as a template image B. It is assumed that the block A and the template image B are used as square image data, and as shown in FIGS. 2C and 2D, the length of one side is represented by N and M (N>M) respectively in the block A and the template image B. In order to facilitate the understanding of the description, the coordinates of the image are defined with the upper left corner of the block A being set as the origin (0, 0), the horizontal direction being set as the X axis, and the vertical direction being set as the Y axis.

Figure 2E:
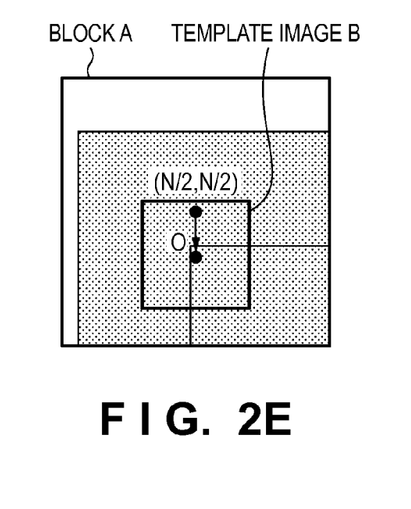

The amount of image movement is calculated according to the following procedure. First, images are overlaid such that the origin (0, 0) shown in FIG. 2C and the position of point P shown in FIG. 2D match, and a total sum of differences in luminance values of all pixels (sum-of-absolute differences=SAD) is calculated. Next, SAD is computed at each position while moving the position of the template image B by one pixel in the X direction and the Y direction in the image of the block A until point P' of FIG. 2D matches the coordinates (N, N) of FIG. 2C. SAD takes a smaller value as the image matching rate is higher, and thus the amount of image movement can be calculated if a position at which SAD takes a minimum value is determined. FIG. 2E shows a positional relationship between the block A and the template image B when SAD takes a minimum value, and a difference between the center coordinates (N/2, N/2) of the block A shown in FIG. 2E and the center coordinates O of the template image B is the amount of image movement in the block A (indicated by an arrow shown in FIG. 2E). The image of the block A is called a "search image" because search is performed for a position at which SAD takes a minimum value by moving the template image within the range of the image of the block A.

The circuit scale of the motion vector detection unit 112 increases as the number of pixels of the search image and the template image increases. Accordingly, in terms of the circuit scale, the number of pixels in each block is desirably as small as possible. On the other hand, in order to perform motion vector detection with high accuracy, each block has to include a characteristic pattern such as the edge of an object. Accordingly, the occupancy of each block in the entire image is desirably large to some extent.

Figure 3A:
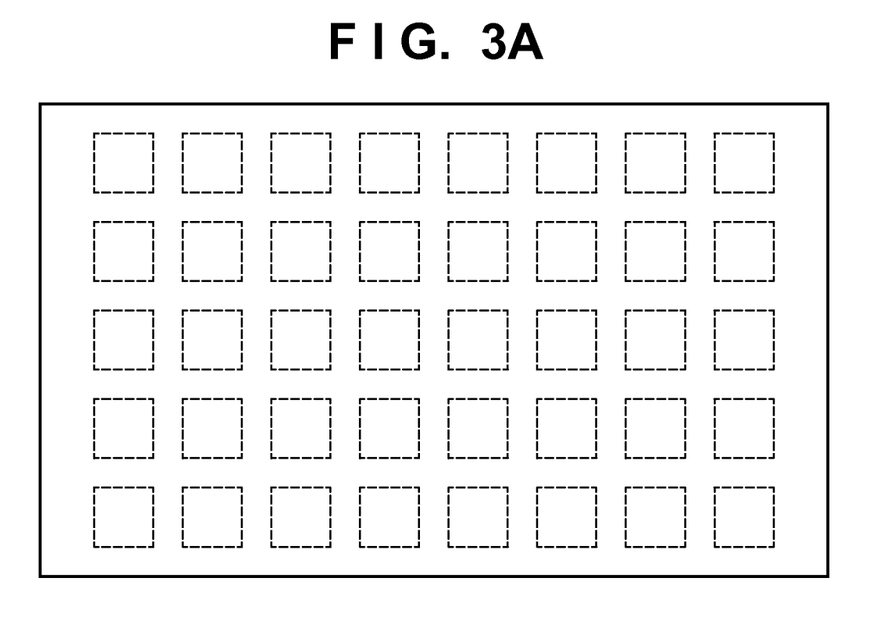
FIGS. 3A and 3B are diagrams illustrating a difference in the size of motion vector detection blocks generated due to a difference in the size of captured images.
Figure 3B:
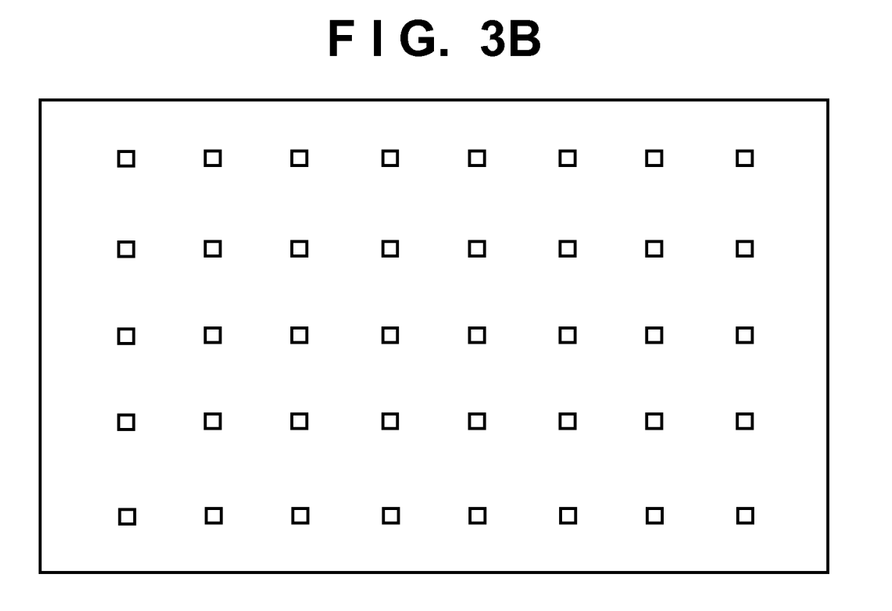

If the number of pixels of the image used to perform motion vector detection increases, but the number of pixels of each block where motion vector detection is performed remains unchanged, the occupancy of each block in the entire image becomes small. For example, if the number of pixels in the motion vector detection block is the same in a full HD sized image and an 8K sized image, the occupancy of each block in the entire image is reduced to $\frac{1}{16}$. As illustrated in FIG. 3A showing a full HD sized image and in FIG. 3B showing a 8K sized image, each block in the 8K sized image has a size indicated by a small square in FIG. 3B if the number of pixels are the same. As can be clearly seen from FIG. 3B, if the occupancy of each block for use in motion vector detection in the entire image is small, the probability that a characteristic pattern such as the edge of an object is included in each block is small, and thus a deterioration in the accuracy of motion vector detection cannot be avoided. Conversely, if the number of pixels in each motion vector detection block is increased in order to prevent the deterioration in the accuracy of motion vector detection, the scale of circuitry for performing motion vector detection increases, causing various problems such as an increase in the power consumption and an increase in the computation time.

In the present embodiment, as described above, the signal processing unit 104 is configured to perform thinning, addition or the like on the image output from the image sensor 103 so as to reduce the image size to a size smaller than that of the image output from the image sensor 103, and thereafter supply the image to the developing unit 105 and the luminance generation unit 110. For example, if the image output from the image sensor 103 is 8K data, the image size is reduced to a full HD size or the like.

The display device 107 is assumed to be a small display device such as an LCD mounted on the image capturing apparatus 100, and can provide sufficient image quality in a reduced image without requiring the need to supply the image using all pixels output from the image sensor 103. In addition, as a result of the number of pixels being reduced in the image supplied to the motion vector detection unit 112 via the luminance generation unit 110, motion vector detection in a wide range as shown in FIG. 3A becomes possible without causing an increase in the circuit scale.

The image processing unit 106 is configured to perform image processing that can be implemented using motion vectors on the video signal supplied from the developing unit 120, and thereafter supply the video signal to the display device 107. For example, an image blur that failed to be corrected by the correction optical system 102 can be detected by the motion vector detection unit 112. At this time, the image processing correction amount computation unit 113 computes the amount of correction of image movement based on the motion vector in each motion vector detection block computed by the motion vector detection unit 112. Then, the image processing unit 106 performs image processing that changes the image display range according to the computed amount of correction. Also, in the case where, for example, the image processing unit 106 performs image compositing such the HDR (High dynamic range) compositing, the image processing correction amount computation unit 113 computes the amount of image shift at the time of image compositing based on the motion vectors computed by the motion vector detection unit 112. Then, the image processing unit 106 executes image compositing processing such as the HDR compositing by using the amount of image shift computed.

In the image processing applied to the reduced image displayed on the display device 107, the accuracy of motion vector detection using the reduced image is sufficient. However, in the image processing applied to the original image recorded in the recording medium 109, the accuracy of motion vector detection using the reduced image is insufficient. Accordingly, in the present embodiment, processing as described below is performed so as to ensure sufficient detection accuracy. In the following description, in order to simplify the description, it is assumed that the size of the image supplied to the luminance generation unit 110 at the time of capturing the moving image is full HD, and the size of the image recorded in the recording medium 109 is 8K.

Figure 4A:
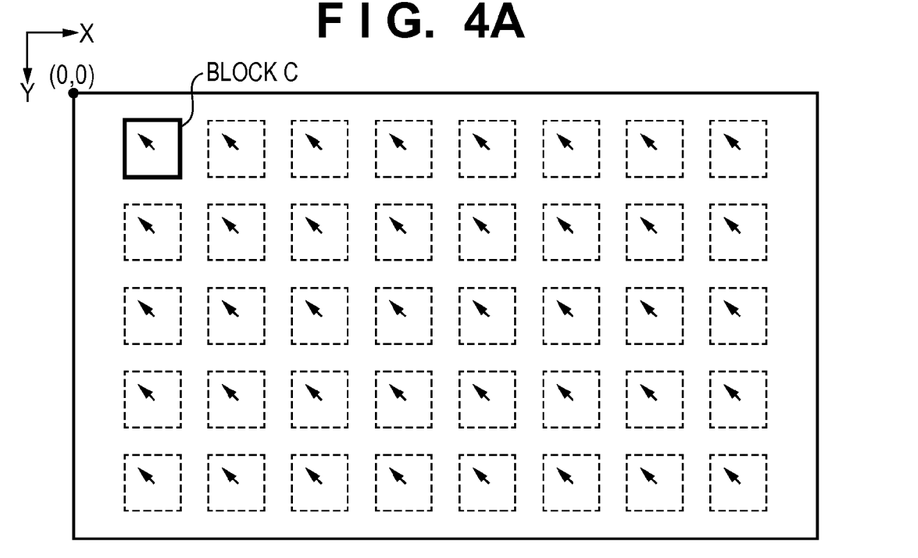
FIGS. 4A and 4B are diagrams illustrating a result of motion vector detection performed by the motion vector detection unit 112 at the time of capturing a moving image.
Figure 4B:
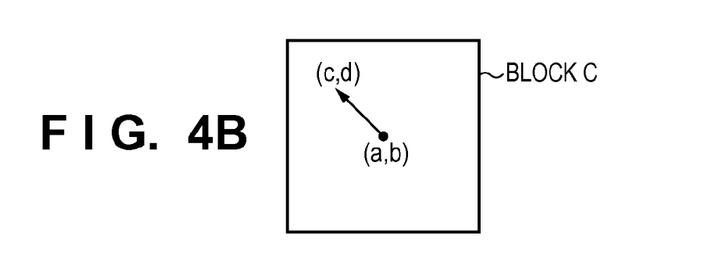

FIG. 4A is a diagram in which results of motion vector computation performed in motion vector detection blocks by using the reduced image supplied from the signal processing unit 104 to the luminance generation unit 110 are indicated by arrows. In FIG. 4A, the coordinates of the image are defined with the upper left corner of the image being set as the origin (0, 0), the horizontal direction being set as the X axis, and the vertical direction being set as the Y axis. FIG. 4B shows an enlarged view of a block C shown in FIG. 4A, and the block C has center coordinates (a, b). Also, the coordinates at which SAD takes a minimum value when a template image having coordinates (a, b) being set as the center is moved on a search image are represented by (c, d).

The metadata generation unit 108 converts the center coordinates of each block and the coordinates at which SAD takes a minimum value into coordinates appropriate for the size of the image supplied from the signal processing unit 104 to the metadata generation unit 108, and records them as metadata in the recording medium 109 in association with the image. In the case where the image supplied to the luminance generation unit 110 is a full HD sized image, and the image supplied to the metadata generation unit 108 is an 8K sized image, the coordinates conversion can be performed by multiplying the center coordinates of each block and the coordinates at which SAD takes a minimum value by four times.

At the time of playback of the recorded image, more highly accurate motion vector detection is performed by using the metadata generated by the metadata generation unit 108. Referring to FIG. 1B, the metadata is read by the metadata analyzing unit 123 from the recording medium 109. The metadata analyzing unit 123 supplies the center coordinates of each block and the coordinates at which SAD takes a minimum value, which are used to perform the above-described motion vector detection, to the motion vector detection unit 112.

Figure 5:
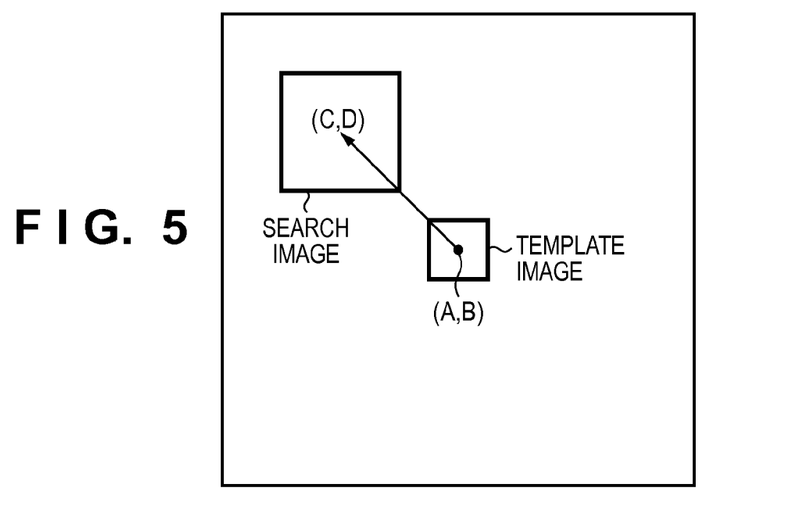
FIG. 5 is a diagram showing an example of the arrangement of a template image and a search image set by the motion vector detection unit 112 at the time of playback of a recorded moving image.

The motion vector detection unit 112 determines a search image range and a template image range, which will be set on the image supplied from the image memory 111 and the luminance generation unit 110, by using the information from the metadata analyzing unit 123. FIG. 5 shows an image at a position corresponding to the block C shown in FIG. 4A in a non-reduced image recorded in the recording medium 109. The number of pixels in the image shown in FIG. 5 is 16 times greater than the number of pixels in the image shown in FIG. 4B, and thus coordinates (C, D)

corresponding to the coordinates (c, d) at which SAD takes a minimum value in FIG. 4B are (4c, 4d), and center coordinates (A, B) are (4a, 4b). These coordinates information are supplied from the metadata analyzing unit 123. A template image is set in a range of image size that is the same as the template image set during the capture of the moving image, with the coordinates (A, B) shown in FIG. 5 being set as the center. On the other hand, a search image is set in a range that is the same as the search image set during the capture of the moving image, namely the image shown in FIG. 4B, or in a range having a smaller number of pixels, with the coordinates (C, D) shown in FIG. 5 being set as the center. At this time, the occupancy of the template image in the entire screen is small, and thus there is a risk that a characteristic pattern may not be included in the template image. However, if the search range is limited to a range that does not exceed the range indicated by the motion vector detected at the time of recording the moving image (for example, ±4 pixels if a 8K sized image has been reduced to a full HD sized image), it is possible to prevent a false detection from occurring in the motion vector detection.

By doing so, in the non-reduced image, it is possible to highly accurately search the vicinity of the area where SAD takes a minimum value detected in the reduced image during the capture of the moving image. Also, in the vector detection performed at the time of playback of the recorded moving image, the number of pixels in the search image and in the template image is not increased from that at the time of capturing the moving image, and it is therefore possible to prevent the circuit scale from increasing significantly.

The computation performed by the image processing correction amount computation unit 122 at the time of playback of the recorded moving image is substantially the same as that performed by the image processing correction amount computation unit 113 at the time of capturing a moving image. However, the image size processed by the image processing unit 106 and the image processing unit 121 is different, and thus the results of motion vector detection supplied from the motion vector detection unit 112 to the image processing correction amount computation unit 122 and the data supplied from the image processing correction amount computation unit 122 to the image processing unit 121 should be output at a resolution appropriate for the image size.

The image processing unit 121 executes the same image processing as that performed by the image processing unit 106 on the video signal from the developing unit 120, and thereafter outputs video data for outputting to the external monitor 200 and the external recording medium 201. As described above, the resolution of the data from the image processing correction amount computation unit 122 is higher than that of the data from the image processing correction amount computation unit 113, and thus the image processing unit 121 can perform highly accurate image processing suitable for the image size. On the other hand, the output from the image processing correction amount computation unit 113 and the output from the image processing correction amount computation unit 122 are different only in that the resolution is changed according to the image size. Accordingly, the image displayed on the display device 107 during the capture of the moving image and the image displayed on the external monitor 200 or the like at the time of playback of the recorded moving image are different only in terms of the number of pixels.

As described above, the present embodiment is configured such that, at the time of capturing the moving image, the image size used in the motion vector detection and in the output to the display device is reduced so as to perform only motion vector detection with sufficient accuracy while suppressing an increase in the circuit scale. On the other hand, at the time of playback of the recorded moving image, the metadata regarding the motion vector detection performed during the capture of the moving image is used so as to perform highly accurate motion vector detection suitable for the size of moving image to be played back without causing an increase in the circuit scale. With this configuration, it is possible to perform image processing, such as blur correction or image compositing, that is optimal at the time of capturing the moving image and at the time of playback of the recorded moving image.

In the block diagram shown in FIG. 1A, a configuration was explained in which the remaining blur after the optical blur correction performed by the correction optical system 102 is detected by the motion vector detection unit, but the correction optical system 102 may be omitted. In addition, the motion vector detection method and the metadata generation method are merely examples, and thus the metadata may be in any data format as long as the metadata includes information regarding the image area where motion vector detection is performed and information regarding the results of motion vector detection.

Also, the present embodiment is configured such that in the motion vector detection processing performed by the motion vector detection unit 112 at the time of playback of the recorded moving image, the image recorded in the recording medium 109 is used without reducing the image size, but the configuration is not limited thereto. A configuration is also possible in which size reduction, thinning processing or the like is performed in a range having a smaller reduction ratio than that during the capture of the moving image. For example, it is possible to use a configuration in which during the capture of the moving image, motion vector detection is performed by using an image obtained by reducing a 8K sized image to a full HD sized image, and during the playback of the recorded moving image, motion vector detection is performed by using an image obtained by reducing a 8K sized image to a 4K sized image.

Second Embodiment

A basic embodiment of the present invention has been described thus far. In the basic embodiment, by adding another information to the metadata, efficient processing and an improvement in the accuracy of vector detection can be achieved, which will be described below.

The motion vector detection performed by the motion vector detection unit 112 has reliability problems such as the accuracy of the results of motion vector detection is low or the results of motion vector detection are not correct depending on the pattern in the motion vector detection blocks. Hereinafter, the reliability of motion vectors will be described.

Figure 6A:
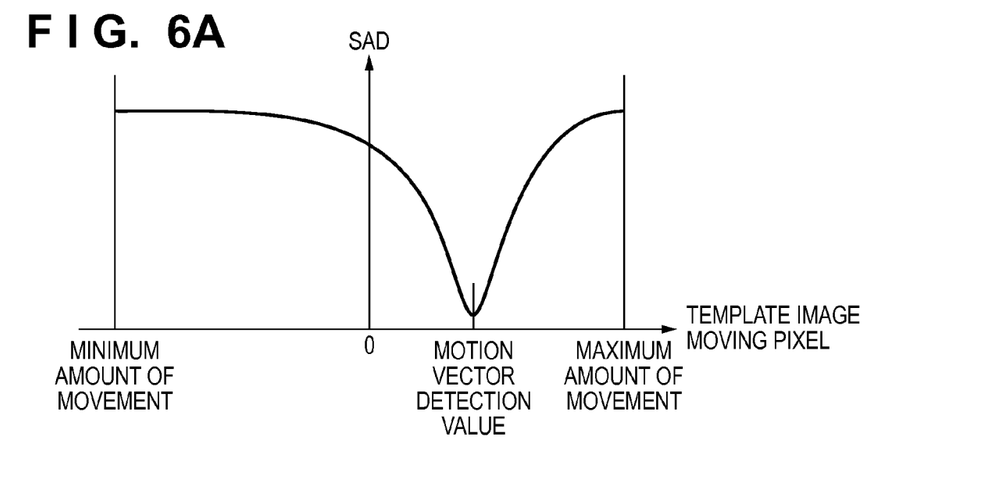
FIGS. 6A to 6C are diagrams illustrating the reliability of motion vector detection.
Figure 6B:
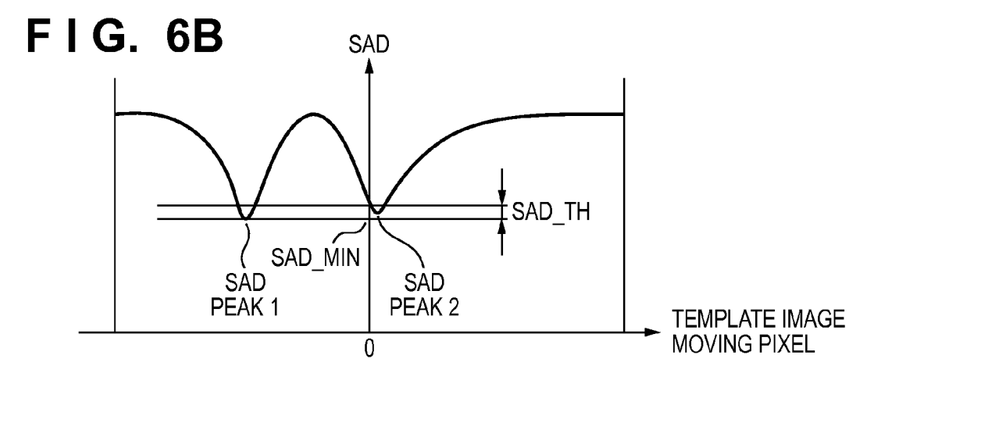
Figure 6C:
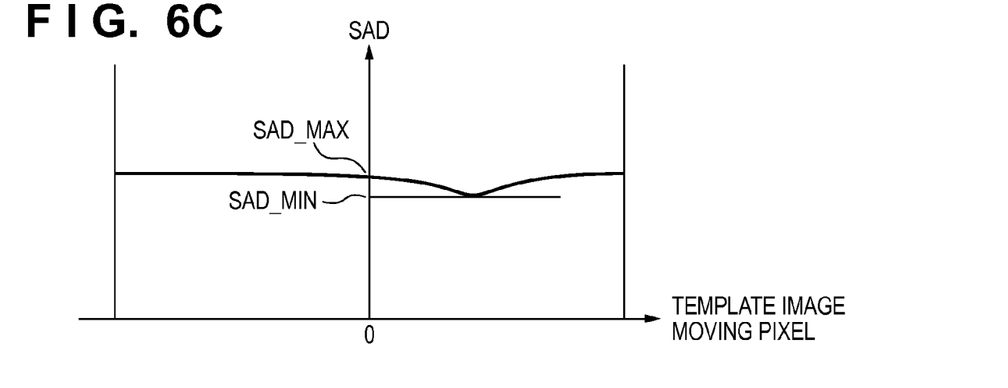

FIGS. 6A to 6C are diagrams showing examples of changes of SAD in the X direction in the motion vector detection that uses a reduced image, which was described with reference to FIGS. 2A to 2E. Ordinarily, SAD is plotted in an X-Y two dimensional map, but in order to facilitate the understanding of the description, SAD is plotted only in the X axis direction. The graphs shown in FIGS. 6A to 6C are graphs with the amount of movement when the X coordinate at the center of the template image matches the X coordinate at the center of the search image being set to 0, the horizontal axis indicating the moving pixel in the template image, and the vertical axis indicating the result of SAD computation. The maximum amount of movement of the template image is determined by the size of the search image and the size of the template image, and in the case of the images shown in FIGS. 2C and 2D, the maximum amount of movement of the template image is ±(N−M)/2.

The change in SAD corresponding to the movement of the template image depends on the captured image. For example, in a block in which a high-contrast object is captured, the difference in the luminance value when the pattern in the search image and the pattern in the template image match is close to 0. Accordingly, as shown in FIG. 6A, a clear difference can be observed between the maximum SAD value and the minimum SAD value, and thus the accuracy of the result of the computation of the amount of image movement is high.

However, in a block in which, for example, an object having the same repeating pattern such as a tile pattern is captured, a plurality of areas are observed where the pattern matches between the search image and the template image. Accordingly, as shown in FIG. 6B, a plurality of areas where SAD takes a value near the minimum value appear, and thus the accuracy of the result of the computation of the amount of image movement is low. In order to determine whether there are a plurality of SAD peaks, the determination is made based on, for example, whether there are at least two SAD peaks that are within a range between a predetermined threshold value (SAD_TH) and an SAD minimum value (SAD_MIN).

Also, in a block in which, for example, a low-contrast object such as the sky is captured, the degree of match between the search image and the template image is low. Accordingly, as shown in FIG. 6C, the difference between SAD maximum value and SAD minimum value is small, and thus the accuracy of the result of the computation of the amount of image movement is low. The determination of reliability can be made quantitatively based on the magnitude of the difference between the SAD maximum value (SAD_MAX) and the SAD minimum value (SAD_MIN).

In the present embodiment, the metadata generation unit 108 records, in addition to the center coordinates of each block and the coordinates at which SAD takes a minimum value described above, the result of reliability determination as metadata in the recording medium 109 in association with the image. At the time of playback of the recorded image, as described above, highly accurate motion vector detection is performed by using metadata, but in the present embodiment, processing as described below is performed by using the metadata indicating the result of reliability determination.

In a first example, the motion vector detection using a non-reduced image performed at the time of playback of the recorded image is not performed in motion vector detection blocks that were determined as having low reliability as a result of the reliability determination, but is performed only in blocks that were determined as having high reliability. For example, if metadata indicating that there are a plurality of SAD peaks as described above is recorded, or if the difference between the SAD maximum value and the SAD minimum value is a predetermined value or less, it is determined that the reliability is low. Alternatively, a configuration is possible in which the number of blocks that are subjected to motion vector detection at the time of playback of the recorded image is designated in advance, and motion vector detection is performed in descending order from the block having the largest difference between the SAD maximum value and the SAD minimum value, or in other words, from the block having the highest motion vector detection reliability. With this configuration, because motion vector detection is performed primarily on motion vector detection blocks having high reliability, highly accurate motion vector detection can be performed, and wasteful power consumption can be reduced.

Figure 7A:
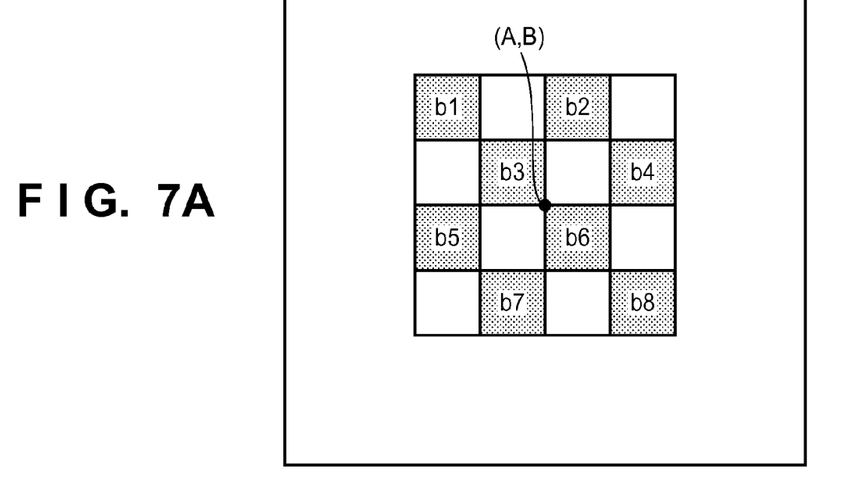
FIGS. 7A and 7B are diagrams showing another example of the arrangement of template images and search images set by the motion vector detection unit 112 at the time of playback of the recorded moving image.
Figure 7B:
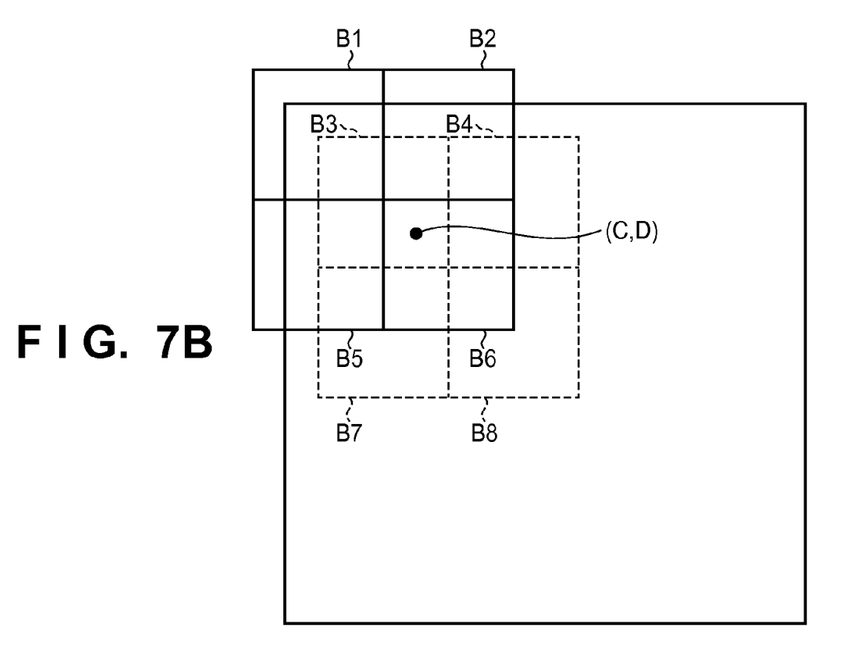

A second example will be described with reference to FIGS. 7A and 7B. FIGS. 7A and 7B are diagrams showing another example of the arrangement of a search image and a template image during motion vector detection at the time of playback of the recorded image, which was described with reference to FIG. 5. In this example, first, the number of motion vector detection blocks at the time of playback of the recorded image is set to one-eighth of the number of motion vector detection blocks set during the capture of the moving image. Then, in the same manner as in the first example, blocks that are to be preferentially subjected to motion vector detection are picked up in descending order from the block having the highest motion vector detection reliability, and template images and search images are set with respect to these blocks.

FIG. 7A shows an example of setting of a template image, and FIG. 7B shows an example of setting of a search image. In FIG. 5, the template image was set with the coordinates (A, B) being set as the center coordinates. However, in FIG. 7A, template images are arranged in a wide range possible including eight blocks (b1 to b8) within the template image range set during the capture of the moving image. Likewise, search images shown in FIG. 7B are arranged at positions (B1 to B8) shifted from the positions of b1 to b8 described above by an amount corresponding to the result of motion vector detection detected during the capture of the moving image.

As described above, in this example, a plurality of template images are arranged with respect to motion vector detection blocks having high motion vector detection reliability within a range of the template image area set during the capture of the moving image. This increases the probability that a characteristic pattern such as the edge of an object is included in any one of the template images, and thus an increase in the motion vector detection accuracy can be achieved. In addition, in this example, the number of blocks subjected to motion vector detection is reduced, and motion vector detection is performed on a plurality of locations within blocks having high motion vector detection reliability, and thus it is possible to prevent an increase in the power consumption resulting from an increase in the processing load for performing motion vector detection.

Third Embodiment

Figure 8A:
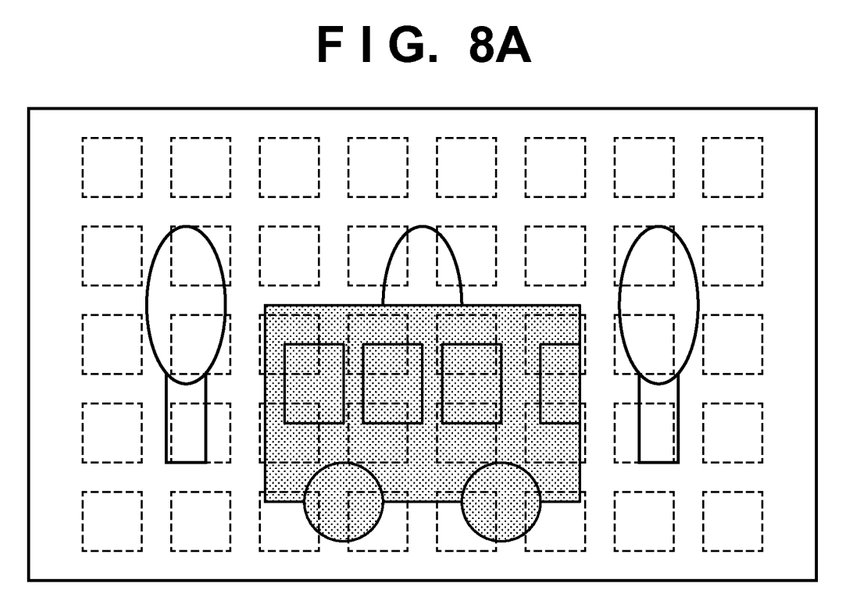
FIGS. 8A and 8B are diagrams illustrating a result of motion vector detection performed by the motion vector detection unit 112 when there is a moving object on a screen.
Figure 8B:
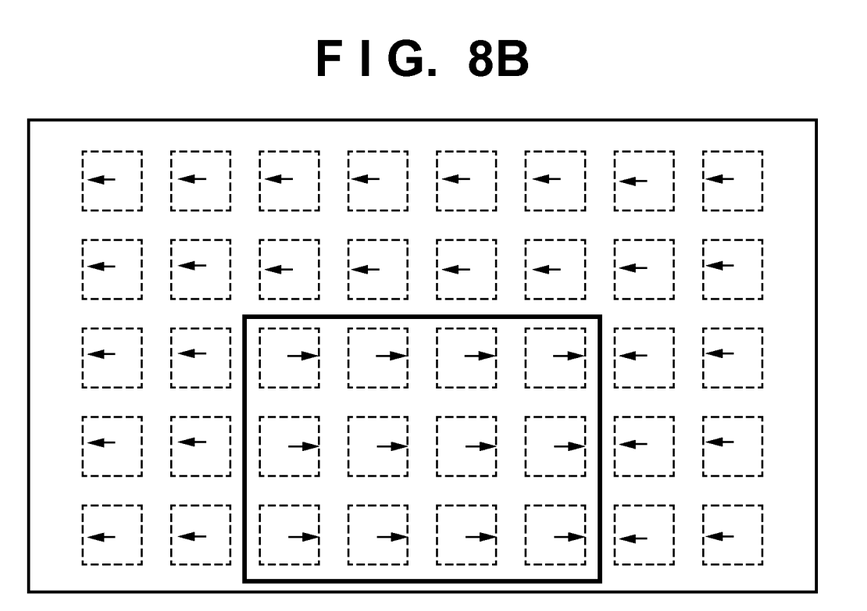

In the motion vector detection performed by the motion vector detection unit 112, in addition to the motion vector detection reliability described above, attention needs to be paid as to whether there is a moving object within the screen. FIGS. 8A and 8B are diagrams illustrating a result of motion vector detection when there is a moving object within the screen.

FIG. 8A shows an image in which there is a moving object at the center of the screen. FIG. 8B shows results of motion vector detection performed on motion vector detection blocks, with arrows indicating the direction and size of the results. The motion vectors located within a thick box indicate the motion vectors of the moving object, and the motion vectors located outside the thick box indicate the motion vectors of the rest of area constituting a background area. As can be seen from FIG. 8B, when there is at least one moving object within the screen, there are at least two areas having motion vectors of different sizes. The image processing correction amount computation unit 113 makes a determination with respect to the plurality of motion vectors having difference sizes as to which of the motion vectors of the areas should be used. As the determination method, various proposals have been made, and any known method can be used. For example, in the case of correcting an image blur caused by hand jittering or the like, the size of the motion vectors of the background area is used.

In the present embodiment, the metadata generation unit 108 records, in addition to the center coordinates of each block and the coordinates at which SAD takes a minimum value described above, motion vector size classification information as metadata in the recording medium 109 in association with the image.

At the time of playback of the recorded image, the metadata indicating the classification information is used to determine the processing performed by the image processing correction amount computation unit 122. As the computation performed by the image processing correction amount computation unit 122 at the time of playback of the recorded moving image, it is necessary to perform the same computation as that performed by the image processing correction amount computation unit 113 at the time of capturing the moving image except for the difference in resolution. Accordingly, in the present embodiment, by using the motion vector size classification information recorded as metadata, a determination is made as to which of the results of motion vector detection of the areas should be used. By doing so, it is possible to prevent a situation in which the image processing correction amount computation unit 113 and the image processing correction amount computation unit 122 perform mutually different processing operations. If in the image processing correction amount computation unit 113 and the image processing correction amount computation unit 122, only the data of one area is used from among the results of motion vector detection of a plurality of areas, the area where detailed motion vector detection is performed at the time of playback of the recorded image may be set as the area used by the image processing correction amount computation unit 122 according to the motion vector size classification information. It is thereby possible to reduce wasteful power consumption.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-129707, filed Jun. 24, 2014, which is hereby incorporated by reference herein in its entirety.

What is claimed is:

1. An image processing apparatus comprising:
    a motion vector detection unit configured to perform motion vector detection by using an image signal output from an image sensor;
    a generation unit configured to generate information regarding a result of the motion vector detection as metadata;
    a recording unit configured to record each frame image of moving image output from the image sensor in a recording medium in association with the metadata; and
    a control unit configured to cause, during an image capturing operation, the motion vector detection unit to perform motion vector detection by using an image signal output from the image sensor on which first reduction processing to reduce a number of pixels of the frame image was performed, and cause, during a playback operation of playing back the recorded age instructed by a user, the motion vector detection unit to narrow an image area in the each frame image in which motion vector detection is to be performed based on the metadata and to perform motion vector detection by using an image signal output from the recording medium on which second reduction processing to reduce a number of pixels of the frame image was not performed or on which the second reduction processing was performed such that a number of pixels of the frame image which has undergone the second reduction processing is larger than number of pixels of the frame image which has undergone the first reduction processing.

2. The image processing apparatus according to claim 1, further comprising:
    a first image processing unit configured to perform image processing by using a result of the motion vector detection during the image capturing operation; and
    a second image processing unit configured to perform image processing by using a result of the motion vector detection during the playback operation of laying back the recorded image,
    wherein the image processing performed by the second image processing unit has a higher resolution than the image processing performed by the first image processing unit.

3. The image processing apparatus according to claim 2, wherein the image processing performed by the first image processing unit and the second image processing unit is electronic image stabilization processing or image compositing processing.

4. The image processing apparatus according to claim 2, wherein the generation unit generates, as metadata, information indicating whether or not there is a moving object obtained by the motion vector detection unit during the image capturing operation, and
the second image processing unit performs image processing by using a result of the motion vector detection on an area selected based on the metadata during the playback operation of playing back the recorded image.

5. The image processing apparatus according to claim 1, wherein the generation unit generates, as metadata, information including a position on an image at which the motion vector detection unit performs motion vector detection during the image capturing operation and the result of the motion vector detection.

6. The image processing apparatus according to claim 1, wherein the generation unit generates, as metadata, information regarding reliability of each motion vector detection area obtained by the motion vector detection unit during the image capturing operation, and
the motion vector detection unit does not perform motion vector detection on an area determined as having low reliability based on the metadata during the playback operation of playing back the recorded image.

7. The image processing apparatus according to claim 1, wherein the generation unit generates, as metadata, information regarding reliability of each motion vector detection area obtained by the motion vector detection unit during the image capturing operation, and
the motion vector detection unit sets the number of the motion vector detection areas during the playback operation of playing back the recorded image to be less than that during the image capturing operation, and preferentially performs motion vector detection on an area determined as having high reliability based on the metadata.

8. The image processing apparatus according to claim 1, wherein the generation unit generates, as metadata, information regarding reliability of each motion vector detection area obtained by the motion vector detection unit during the image capturing operation, and
the motion vector detection unit sets the number of the motion vector detection areas during the playback operation of playing back the recorded image to be less than that during the image capturing operation, and performs motion vector detection on a plurality of areas obtained by further dividing an area determined as having high reliability based on the metadata.

9. An image processing apparatus comprising:
an analysis unit configured to analyze metadata that is information regarding a result of motion vector detection recorded in association with each frame image of a moving image output from an image sensor; and
a control unit configured to cause, during a playback operation of playing back the recorded image instructed by a user, an image area in the each frame image in which motion vector detection is to be performed to be narrowed based on the metadata, and motion vector detection to be performed by using an image signal output from a recording medium on which first reduction processing to reduce a number of pixels of the frame image was not performed or on which first reduction processing was performed such that a number of pixels of the frame image which has undergone the first reduction processing is larger than a number of pixels of the frame image which has undergone the second reduction processing to reduce a number of pixels of the frame image during an image capturing operation,
wherein the metadata is data obtained by motion vector detection performed using an image signal output from the image sensor on which the second reduction processing was performed.

10. The image processing apparatus according to claim 9, wherein a second image processing which is performed by using a result of the motion vector detection during the playback operation of playing back the recorded image has higher resolution than a first image processing which is performed by using a result of the motion vector detection during the image capturing operation.

11. The image processing apparatus according to claim 10, wherein the image processing performed in the first image processing and the second image processing is electronic image stabilization processing or image compositing processing.

12. The image processing apparatus according to claim 10, wherein the analysis unit analyses information, recorded as metadata, indicating whether or not there is a moving object obtained by the motion vector detection during the image capturing operation, and the second image processing is performed by using a result of the motion vector detection on an area selected based on the metadata during the playback operation of playing back the recorded image.

13. The image processing apparatus according to claim 9, wherein the metadata is information including a position on an image at which the motion vector detection is performed during the image capturing operation and the result of the motion vector detection.

14. The image processing apparatus according to claim 9, wherein the analysis unit analyses information, recorded as metadata, regarding reliability of each motion vector detection area obtained by the motion vector detection during the image capturing operation, and the control unit does not perform motion vector detection on an area determined as having low reliability based on the metadata during the playback operation of playing back the recorded image.

15. The image processing apparatus according to claim 9, wherein the analysis unit analyses information, recorded as metadata, regarding reliability of each motion vector detection area obtained by the motion vector detection during the image capturing operation, and the control unit sets the number of the motion vector detection areas during the playback operation of playing back the recorded image to be less than that during the image capturing operation, and preferentially performs motion vector detection on an area determined as having high reliability based on the metadata.

16. The image processing apparatus according to claim 9, wherein the analysis unit analyses information, recorded as metadata, regarding reliability of each motion vector detection area obtained by the motion vector detection during the image capturing operation, and the control unit sets the number of the motion vector detection areas during the playback operation of playing back the recorded image to be less than that during the image capturing operation, and performs motion vector detection on a plurality of areas obtained by further dividing an area determined as having high reliability based on the metadata.

17. A control method for controlling an image processing apparatus, the method comprising:
- a motion vector detection step of performing motion vector detection by using an image signal output from an image sensor;
- a generation step of generating information regarding a result of the motion vector detection as metadata;
- a recording step of recording each frame image of a moving image output from the image sensor in a recording medium in association with the metadata; and
- a control step of causing, during an image capturing operation, the motion vector detection step to perform motion vector detection by using an image signal output from the image sensor on which first reduction processing to reduce a number of pixels of the frame image was performed, and causing, during a playback operation of playing back the recorded image instructed by a user, the motion vector detection step to narrow an image area in the each frame image in which motion vector detection is to be performed based on the metadata and to perform motion vector detection by using an image signal output from the recording medium on which second reduction processing to reduce a number of pixels of the frame image was not performed or on which the second reduction processing was performed such that a number of pixels of the frame image which has undergone the second reduction processing is larger than a number of pixels of the frame image which has undergone the first reduction processing.

18. A computer-readable storage medium storing a program for causing a computer to execute the steps of the control method according to claim 17.

19. A control method for controlling an image processing apparatus, the method comprising:
- an analysis step of analyzing metadata that is information regarding a result of motion vector detection recorded in association with each frame image of a moving image output from an image sensor, and
- a control step of causing, during a playback operation of playing back the recorded image instructed by a user, an image area in the each frame image in which motion vector detection is to be performed to be narrowed based on the metadata, and motion vector detection to be performed by using an image signal output from a recording medium on which first reduction processing to reduce a number of pixels of the frame image was not performed or on which first reduction processing was performed such that a number of pixels of the frame image which has undergone the first reduction processing is larger than a number of pixels of the frame image which has undergone the second reduction processing to reduce number of pixels of the frame image during an image capturing operation.
- wherein the metadata is data obtained by motion vector detection performed using an image signal output from the imago sensor on which the second reduction processing was performed.

20. A computer-readable storage medium storing a program for causing a computer to execute the steps of the control method according to claim 19.

* * * * *